United States Patent [19]
Strand et al.

[11] Patent Number: 5,851,094
[45] Date of Patent: Dec. 22, 1998

[54] TOOL FOR CHIP REMOVAL

[75] Inventors: Bengt Strand; Karl-Erik Berglöw, both of Fagersta, Sweden

[73] Assignee: Seco Tools AB, Fagersta, Sweden

[21] Appl. No.: 979,113

[22] Filed: Nov. 26, 1997

[30] Foreign Application Priority Data

Dec. 3, 1996 [SE] Sweden ................................ 9604445-8

[51] Int. Cl.$^6$ .................. B23C 5/28; B23B 51/06
[52] U.S. Cl. .................. 409/234; 279/70; 407/11; 408/59
[58] Field of Search .................. 409/234, 136; 408/59, 57, 56; 407/11; 173/210, 211; 279/75, 76, 70; 451/342

[56] References Cited

U.S. PATENT DOCUMENTS

| | | | |
|---|---|---|---|
| 2,612,377 | 9/1952 | Edens | 279/76 X |
| 3,313,186 | 4/1967 | Rochon | 407/11 X |
| 4,302,135 | 11/1981 | Lillie | 408/59 |
| 4,705,435 | 11/1987 | Christoffel | 407/114 |
| 4,850,759 | 7/1989 | Strand et al. | 408/239 A |
| 5,011,346 | 4/1991 | Pfalzgraf | 409/234 |
| 5,030,047 | 7/1991 | Pfalzgraf | 409/234 |
| 5,688,163 | 11/1997 | Siden | 279/20 X |

FOREIGN PATENT DOCUMENTS 3224141  12/1983  Germany ................ 408/59

*Primary Examiner*—William R. Briggs
*Attorney, Agent, or Firm*—Burns, Doane, Swecker & Mathis, L.L.P.

[57] ABSTRACT

A tool for rotary chip removal machining includes a cutting head, a retention element and a shank. The cutting head includes a rear mounting portion and the retention element includes a front retaining portion. The mounting and retaining portion present forwardly facing and rearwardly facing surfaces, respectively, which engage one another for retaining the cutting head in the shank. The hook of the cutting head is asymmetrical with respect to the axis and is larger than the hook of the retention element. The cutting head includes a central flushing channel for conducting a flushing medium. The channel extends through the mounting portion of the cutting head for reducing the mass of that hook. The retention element includes a central channel which does not extend through the retaining portion.

13 Claims, 2 Drawing Sheets

TOOL FOR CHIP REMOVAL

BACKGROUND OF THE INVENTION

The present invention relates to a tool for rotary chip removal machining and to a cutting head for the tool.

Prior Art

It is previously known through commonly-owned Strand et al. U.S. Pat. No. 4,850,759 to provide a solution to the problem of providing small-dimensioned milling and drilling tools with interchangeable cutting edges. However in some cases at high rotational speeds, the known tool tends to vibrate and create unwanted patterns or vibrational marks in the work piece. This, in combination with a tendency for the tool to sometimes become overheated has been problematic for the user.

Objects of the Invention

One object of the present invention is to provide a tool which stays rigid even at high rotational speeds.

Another object of the present invention is to provide a tool which is subjected to good cooling.

Still another object of the present invention is to provide a cutting head which enables good stability and good cooling.

SUMMARY OF THE INVENTION

These and other objects of the present invention are realized by a milling tool for rotary chip removal machining comprising a shank defining an axis of rotation, a cutting head mounted in the shank and projecting forwardly therefrom along the axis, and a retention element for retaining the cutting head within the shank. A rear mounting portion of the cutting head is asymmetrical with respect to the axis and is intersected by the axis. The rear mounting portion includes a generally forwardly facing surface. The retention element is mounted in the shank and includes a generally rearwardly facing surface engaging the generally forwardly facing surface of the cutting head. The cutting head includes a cutting edge formed at a front end thereof. A channel extends axially through the cutting head and is adapted to conduct a flushing medium to the front end. The channel extends through the rear mounting portion of the cutting head and intersects the generally forwardly facing surface thereof.

The invention also relates to the cutting head per se.

BRIEF DESCRIPTION OF THE DRAWINGS

The objects and advantages of the invention will become apparent from the following detailed description of a preferred embodiment thereof in connection with the accompanying drawings, in which like numerals designate like elements, and in which.

DETAILED DESCRIPTION OF A PREFERRED EMBODIMENT OF THE INVENTION

Figure 1:
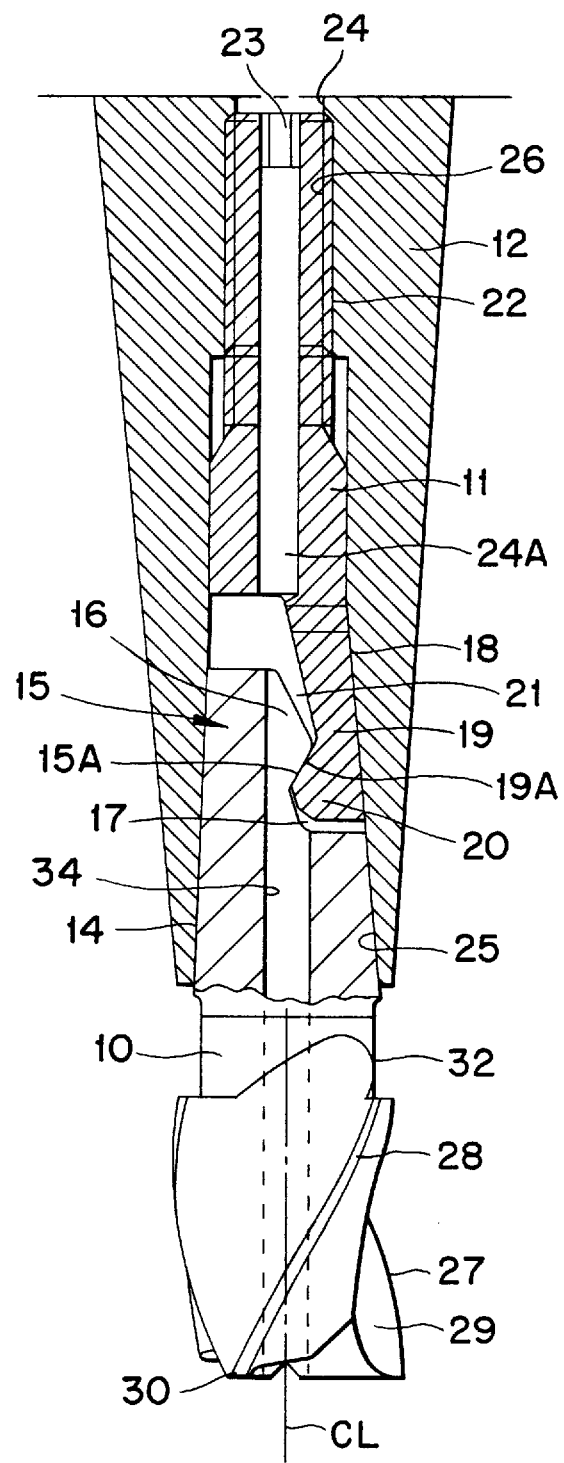
FIG. 1 shows a tool according to the present invention in an assembled condition, partly in crosssection.
Figure 2A:
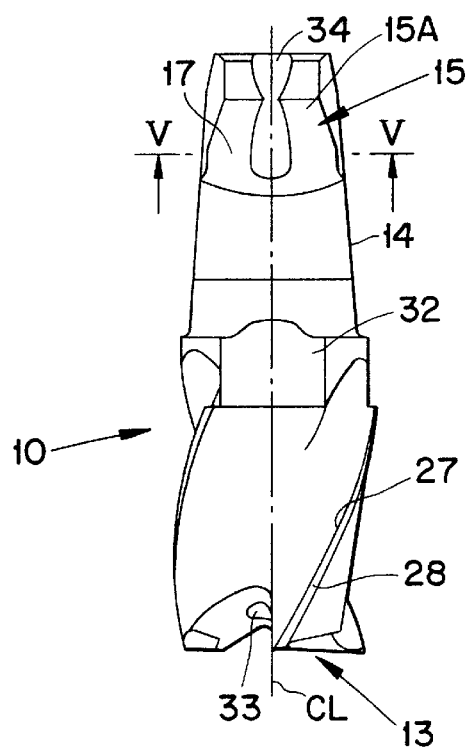
FIGS. 2A and 2B show side views of a cutting head according to the present invention, more in detail.
Figure 2B:
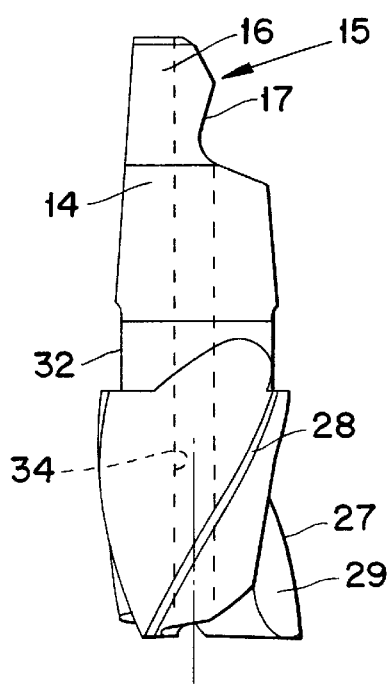
Figure 3:
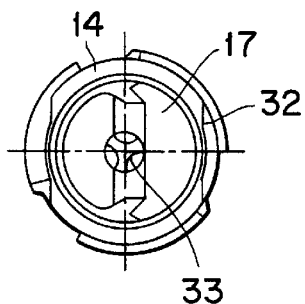
FIG. 3 shows a front view of a cutting head according to the present invention.
Figure 4:
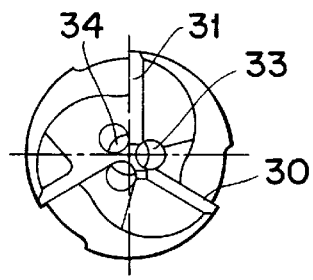
FIG. 4 shows a rear view of a cutting head according to the present invention.
Figure 5:
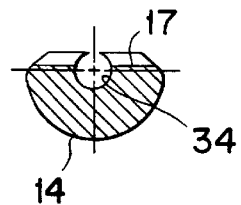
FIG. 5 shows a cross section according to the line V—V in FIG. 2A.

The embodiment of a tool according to the present invention shown in FIG. 1, comprises a cutting head 10, a locking screw 11 and a shank 12. Hook-shaped ends 15, 19 of the cutting head and the locking screw, constitute a rear mounting portion 15 and a front retaining portion 19, respectively. Those front and rear ends 15 and 19 present forwardly and rearwardly facing surfaces 15A, 19A respectively, which engage one another to retain the cutting head 10 in the shank. Extending through the cutting head is a central channel 34 which also extends through the hook-shaped end 15 of the cutting head. A central channel 24A extends through the locking screw 11, but preferably does not extend through the hook-shaped end 19 of the locking screw. One function of the channels is to transfer flushing medium and another function is to diminish the masses of the cutting head and locking screw.

The channel 34 intersects the forwardly facing surface 15A of the cutting head, causing the center of gravity in the area of the hook-shaped ends to be disposed closer to the axis CL of rotation of the tool than would otherwise be the case, and therefore the tool becomes dynamically centered. That is, the rear hook 15 is asymmetrical with respect to the axis CL; the rear hook 15 is radially wider than the front hook 19 and is intersected by the axis CL. The front hook 19 is spaced from the axis. Thus, in the absence of the channel 34, the rear hook 15 would be significantly heavier than the front hook 19, leading to an unbalanced condition during rotation of the tool. The presence of the channel 34, however, reduces the mass of the rear hook 15, thereby minimizing the extent of any unbalance.

The cutting head 10 is provided with at least one cutting edge at the end 13 facing away from the shank 12, which is given different designs depending on the area of application. A preferred shape of the forward end of the cutting head 10 is shown in detail in FIGS. 2A–5. The cutting head 10 is formed of hard material, preferably cemented carbide, and comprises three screw-shaped first or major cutting edges 27. The number of major cutting edges may alternatively be one, two or four to six.

Each major cutting edge 27 is formed along the intersection line of a clearance surface or protruding land 28 and a chip surface or chip flute 29. The major cutting edges 27 lie in a common, imaginary cylinder which is concentric with the axis common CL of the cutting head and tool. Each chip flute 29 is concavely formed and extends from a second or minor cutting edge 30 in a direction axially inwardly from a free end 13 of the cutting head. Each minor cutting edge 30 is formed at the intersection of the chip flute 29 and an end surface 31 and essentially has a radial extension inwards from a front end of a respective major cutting edge 27. The minor cutting edge substantially extends to the axis of rotation CL of the cutting head such that the tool is able to drill downwards into the work piece during milling. Each major cutting edge and its respective minor cutting edge is fed with flushing medium via a respective hole 33. Three holes 33 are provided and are arranged symmetrically about the axis of rotation of the cutting head and are connected to the central channel 34.

At its rear end facing towards the shank 12, the cutting head is provided with a first conical portion 14, which includes the hook 15. The hook 15 comprises a first lip 16 as well as a first recess 17. The intermediate portion of the cutting head 10 is provided with a key grip 32, the application of which is explained below.

The locking screw 11, which preferably is formed of steel, has a second conical portion 18 at its front end facing towards the cutting head, which includes the hook 19. As shown in FIG. 1, the provision of the second hook 19 implies that a substantial part of the second conical portion 18 has been removed. The second hook 19 comprises a second lip 20 as well as a second recess 21. In the active position, the first lip 16 cooperates with the second recess 21, and the second lip 20 cooperates with the first recess 17. The second lip 20 is preferably intact, that is, no channel for flushing medium is formed in this lip, and therefore the mass of the second hook 19 is relatively similar to the mass of the first hook 15 such that wobbling is substantially avoided.

At a location axially behind the second hook 19, the locking screw 11 has an externally threaded, preferably cylindrical portion 22. An Allen key grip 23 is provided at the axially rearwardmost end of the locking screw 11, whereby loosening or tightening of the locking screw 11 in a thread 26 of an internal recess 24 of the shank 12 is made possible. Normally, however, tightening or loosening of the locking screw is accomplished through the external key grip 32. Alternatively, the thread 26 may be arranged at an end of a releasable sleeve, the other end of which then is provided with an external thread as well as a key grip.

The shank 12 is provided with a conical seat 25 at its front end facing towards the cutting head 10, which receives the first and second conical portions 14 and 18 of the cutting head 10 and the locking screw 11, respectively.

Mounting and dismounting of the tool are more closely described in U.S. Pat. No. 4,850,759, which is hereby incorporated by reference into the present description. Cooperation between the external thread 22 and the internal thread 26 means that the locking screw 11 and thereby also the cutting head 10 are displaced axially into the shank 12 until the cone-shaped portion 14 comes into abutment against the conical seat 25, i.e., the position according to FIG. 1 has been achieved. The cutting head 10 is now anchored in the shank 12 in a satisfactory manner. Thereby a channel for flushing medium has been formed through the tool via the recesses 24A, 24, 34 and 33.

The threads 22 and 26 are formed as right-hand threads in tools for right-hand cutting and as left-hand threads in tools for left-hand cutting.

In the above described embodiment, the cone angle for the cutting head and seat should be less than 25°. In addition it shall be pointed out that the described embodiment relates to milling cutters, i.e., tools which rotate about their longitudinal center axes. Milling cutters with small cutting portions are expected to be the main area of application for the present invention but also drilling tools fall within the intended use of the invention.

Although the present invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A milling tool for rotary chip removal machining comprising a shank defining an axis of rotation, a cutting head mounted in the shank and projecting forwardly therefrom along the axis, and a retention element for retaining the cutting head within the shank; a rear mounting portion of the cutting head being asymmetrical with respect to the axis and intersected by the axis, the rear mounting portion including a generally forwardly facing surface; the retention element mounted in the shank and including a front retaining portion asymmetrical with respect to the axis, the front retaining portion including a generally rearwardly facing surface engaging the generally forwardly facing surface of the cutting head; the cutting head including a cutting edge formed at a front end thereof; a rear channel extending axially through the retention element; a front channel extending axially through the cutting head and adapted to conduct a flushing medium to the front end, the channel extending through the rear mounting portion of the cutting head and intersecting the generally forwardly facing surface thereof.

2. The milling tool according to claim 1 wherein the rear mounting portion is hook-shaped to define the generally forwardly facing surface.

3. The milling tool according to claim 2 wherein the cutting head is formed of cemented carbide.

4. The milling tool according to claim 3 wherein the retention member is formed of steel.

5. The milling tool according to claim 1 wherein the retention element has an external screw thread releasably threadedly mounted in the shank; the shank forming a conical seat tapering down in a rearward direction; the cutting head including a conical mounting portion received in the conical seat.

6. The milling tool according to claim 1 wherein the retaining portion is spaced laterally from the rear channel.

7. A cutting head for rotary chip removal machining, the cutting head defining an axis of rotation and comprising a rear mounting portion having a generally forwardly facing surface; and a front portion having a cutting edge; the rear mounting portion being asymmetrical with respect to the axis and intersected by the axis; a channel extending axially through the cutting head and adapted to conduct a flushing medium to a front end thereof, the channel extending through the rear mounting portion and intersecting the generally forwardly facing surface thereof.

8. The cutting head according to claim 7 wherein the rear mounting portion is hook-shaped.

9. The cutting head according to claim 8 wherein the cutting head is formed of cemented carbide.

10. The cutting head according to claim 9 wherein the cutting edge is screw shaped and formed by the intersection of a clearance surface and a chip surface disposed on the front portion.

11. The cutting head according to claim 10 wherein there are at least two of the cutting edges, the cutting edges lying on an imaginary cylinder coaxially arranged with respect to the axis.

12. The cutting head according to claim 11 wherein the screw shaped cutting edges constitute major cutting edges, the front end further including a minor cutting edge connected to a forward end of each major cutting edge, the minor cutting edges extending generally radially.

13. The cutting head according to claim 12 wherein the cutting head includes a plurality of holes extending rearwardly from the front end and connected to the channel, there being one hole for each major cutting edge, the holes arranged symmetrically about the axis.

* * * * *